Patented Jan. 18, 1927.

1,614,753

UNITED STATES PATENT OFFICE.

PAUL S. MOYER, OF CHICAGO, ILLINOIS, ASSIGNOR TO THE ARIDOR COMPANY, OF CHICAGO, ILLINOIS, A CORPORATION OF ILLINOIS.

DEHYDRATING UNIT.

No Drawing.   Application filed July 9, 1923.   Serial No. 650,488.

This invention relates to so-called dehydrating units, comprising bodies of moisture attracting and absorbing material, for use in food containers and the like.

For example, such bodies are used in containers for bakery, confectionery, and other food products to maintain their crispness or freshness by keeping the air in the containers dry and by absorbing such atmospheric moisture as may be occasionally admitted to the containers during opening and closing of the same.

Among other objects, the present invention is intended to provide a body of efficient moisture-collecting action and one which will hold together well in service and remain substantial and firm after saturation or absorption of its full capacity of moisture.

It is also desired to provide a body having neutralizing and absorbing action toward objectionable gases or odors, such as under some conditions might be generate in minute quantities by the hygroscopic ingredient of the body, or by impurities therein, or may arise from the food contents of the containers.

Bodies of the nature referred to may be made by solidifying appropriate masses of a wet composition of suitable constituency, moulded in units of desired form and size, and drying the same preferably by baking in an oven for thorough dehydration and intimate binding of the ingredients.

The composition from which the units are moulded should contain a hygroscopic substance and be otherwise of such constituency as to form, when solidified, a porous or absorbent medium impregnated with the hygroscopic agent. Calcium chloride, for example, is well known as an efficient hygroscopic substance suitable for such impregnation.

To obtain a body of advantageous coherency, strength and firmness, and one which will retain its firmness in saturated state, a cementitious substance such as hydraulic cement or Portland cement is incorporated in the absorbent medium impregnated with the hygroscopic agent, thereby furnishing a stiffening and strengthening backbone of the cementitious substance.

The cementitious ingredient of the body material also promotes the moulding and setting of the body in the wet state, and the parting of the solidified body from the mould in which it is baked, giving a clean-cut product of desired form.

By employing hydraulic cement, the advantage is obtained of a quicker setting of the body when moulded, and an increased resistance of the solidified body to deterioration by the action of moisture.

A composition suitable for the purposes in view may be made by admixing cement with an appropriate aggregate containing a large percentage of an inorganic or earthy substance adapted to provide porosity or moisture-absorbing capacity in the solidified body, and incorporating in the mixture a suitable hygroscopic substance such as calcium chloride.

As the basic substance for the aggregate, infusorial earth (comprising the shells of myriads of diatoms) is excellent, because of its high porosity and moisture absorbing property. Furthermore, this substance is not subject to fusion or hard cooking in the baking of the body at ordinary temperatures.

Some sand or the like should be included in the aggregate to supply granular material for adherence and setting of the cement thereto, and for furthering the cementitious bonding of the ingredients.

Fibrous binding material may be advantageously included in the mixture, and in view of the contemplated baking of the body it is preferable to employ heat-resistant binding material such as asbestos fibres.

As before indicated, it is desired to obtain a body which in addition to its air-dehydrating property shall have neutralizing and absorbing action toward objectionable gases and odors.

In this connection, either hydraulic or Portland cement supplies the desirable ingredient of lime, which has the property of neutralizing gases and odors. If not supplied or sufficiently present in the cementitious substance, lime may be included as an additional ingredient.

A suitable amount of charcoal may be included in the mixture, this element being desirable because of its effective absorptivity of gases and odors.

An appropriate mixture for producing a body of the several desired characteristics mentioned may comprise the following ingredients in substantially the proportions stated, though such proportions may be varied:

| | Per cent. |
|---|---|
| Hydraulic cement | 19 |
| Silica sand | 8 |
| Infusorial earth | 25 |
| Asbestos | 10 |
| Charcoal | 3 |
| Calcium chloride | 35 |

The calcium chloride should be as chemically pure as is commercially obtainable, since calcium chloride contaminated with impurities, particularly magnesium chloride, is liable to give off minute quantities of a slightly odorous gas; though in a body of the constituency described such gas would be largely neutralized or absorbed by the lime and charcoal in the body.

The substances comprising the mixture, and being in powdered or granular form, should be thoroughly intermixed with each other and with sufficient water or liquid to produce a pasty or semi-fluid composition; or the cement, sand, earth, asbestos and charcoal may be introduced and thoroughly stirred in a liquid solution of calcium chloride, so as to produce such pasty composition; and appropriate masses of such composition may be solidified and thoroughly dried preferably by baking in an oven as before stated.

Usually the composition is solidified in units of such forms as briquettes, bars, cakes, pads, wafers or the like, as may be most appropriate for particular uses.

Such units may be suitably mounted in food containers, for instance by attachment of a unit to the inside of the lid or closure of the container, or enclosure of a unit in a perforated holder attached to the lid or otherwise appropriately supported within the container, so as to permit the air in the container to circulate in contact with and through the pores of the unit, with accompanying dehydration and purification of the air.

When after a prolonged period of service the unit has taken on its full capacity of moisture from the air in the container, or from the outside air admitted during more or less frequent opening and closing of the container, the unit may be removed and restored to its original hygroscopic and deodorizing condition by again baking it in an oven for thoroughly drying out the moisture.

A dehydrating unit of material such as described has the characteristic of a highly porous absorbent structure incorporating a cementitious fabric and composed of a substance having affinity for moisture; combines air dehydrating action, and in this instance gas or odor-neutralizing and absorbing properties, with advantageous characteristics as to coherency, firmness and strength, whereby the body holds together well in service, resists crumbling and deterioration by the action of moisture, and retains firmness and rigidity in the saturated state, or in other words is adapted to absorb its capacity of moisture without becoming objectionably limp and soggy.

Having thus described my invention, I claim:

1. A dehydrating unit comprising a porous absorbent body impregnated with a hygroscopic agent and having incorporated therein a cementitious strengthening substance supplying an agent which in event of the generation of odorous gas by impurities in the hygroscopic agent will neutralize said gas.

2. A dehydrating unit comprising porous earthy material, granular material, fibrous binding material, gas and odor neutralizing and absorbing materials, hygroscopic material, and a cementitious material.

3. A dehydrating unit comprising cement, sand, infusorial earth, asbestos, charcoal and calcium chloride.

4. A dehydrating unit comprising the following ingredients in substantially the proportions stated: hydraulic cement, 19%; silica sand, 8%; infusorial earth, 25%; asbestos, 10%; charcoal, 3%; and calcium chloride, 35%.

5. A dehydrating unit comprising the solidified product of a wet composition containing cement in admixture with an inorganic or earthy substance of high porosity and a hygroscopic substance.

6. A dehydrating unit comprising the solidified product of a wet composition containing cement, infusorial earth and a hygroscopic substance.

7. A dehydrating unit comprising a coherent body of moisture absorbent material containing a hygroscopic substance such as calcium chloride in admixture with material including cement and a quantity of infusorial earth substantially larger than the quantity of cement.

8. A dehydrating unit comprising a coherent body of moisture absorbent material containing a hygroscopic substance such as calcium chloride in admixture with material including sand, cement and a quantity of infusorial earth substantially larger than the quantity of cement.

In testimony whereof, I have signed my name to this specification.

PAUL S. MOYER.